United States Patent
Hahn et al.

(10) Patent No.: US 9,380,614 B2
(45) Date of Patent: Jun. 28, 2016

(54) METHOD OF PERFORMING COMMUNICATION BY USER EQUIPMENT IN CLOUD RADIO ACCESS NETWORK ENVIRONMENT AND APPARATUS THEREFOR

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/286,799

(22) Filed: May 23, 2014

(65) Prior Publication Data

US 2014/0349667 A1 Nov. 27, 2014

Related U.S. Application Data

(60) Provisional application No. 61/826,530, filed on May 23, 2013.

(51) Int. Cl.
| | |
|---|---|
| *H04W 76/02* | (2009.01) |
| *H04W 48/20* | (2009.01) |
| *H04W 88/08* | (2009.01) |
| *H04W 48/10* | (2009.01) |
| *H04W 72/00* | (2009.01) |

(52) U.S. Cl.
CPC .............. *H04W 76/02* (2013.01); *H04W 48/20* (2013.01); *H04W 48/10* (2013.01); *H04W 72/00* (2013.01); *H04W 88/085* (2013.01)

(58) Field of Classification Search
CPC ... H04W 76/02; H04W 48/20; H04W 88/085; H04W 48/10; H04W 72/00
See application file for complete search history.

(56) References Cited

U.S. PATENT DOCUMENTS

| | | | |
|---|---|---|---|
| 2013/0017852 A1* | 1/2013 | Liu et al. | 455/509 |
| 2014/0018090 A1* | 1/2014 | Khoryaev et al. | 455/452.1 |
| 2014/0241315 A1* | 8/2014 | Niu et al. | 370/331 |
| 2014/0255034 A1* | 9/2014 | Huo | 398/82 |
| 2015/0237571 A1* | 8/2015 | Laraqui et al. | H04W 48/20 |

FOREIGN PATENT DOCUMENTS

WO    WO 2009/151355 A1 * 10/2008    ............ H04W 36/06

* cited by examiner

*Primary Examiner* — Brandon Miller
(74) *Attorney, Agent, or Firm* — Lee, Hong, Degerman, Kang & Walmey; Jonathan Kang; Michael Monaco

(57) ABSTRACT

The present invention relates to a method of configuring a user equipment-based communication area in a cloud radio access network environment and an apparatus therefor. As one embodiment of the present invention, a method of performing a communication, which is performed by a user equipment (UE) in a cloud radio access network environment includes the steps of generating an RRU list based on signal strength of downlink signals received from each of one or more RRUs (remote resource unit), setting a UE-based communication area in a manner of transmitting the RRU list to a BBU (base band unit) via a first RRU among the one or more RRUs and establishing an RRC connection with a second RRU within the UE-based communication area.

18 Claims, 10 Drawing Sheets

MeNB : macro eNode B  MUE : macro UE
PeNB : pico eNodeB  PUE : pico UE
FeNB : femto eNode B  FUE : femto UE

METHOD OF PERFORMING COMMUNICATION BY USER EQUIPMENT IN CLOUD RADIO ACCESS NETWORK ENVIRONMENT AND APPARATUS THEREFOR

CROSS-REFERENCE TO RELATED APPLICATIONS

Pursuant to 35 U.S.C. §119(e), this application claims the benefit of the U.S. Provisional Application Ser. No. 61/826,530, filed on May 23, 2013, the contents of which are hereby incorporated by reference herein in its entirety.

BACKGROUND OF THE INVENTION

1. Field of the Invention

The present invention relates to a method of performing communication, which is performed by a user equipment in a cloud radio access network environment and an apparatus therefor.

2. Discussion of the Related Art

Generally, a radio access network (RAN) consisting of a base station (hereinafter abbreviated BS) and a user equipment (hereinafter abbreviated UE) widely provides various kinds of communication services including audio, data and the like to the UE via one or more BSs. In general, one BS may mean one or more cells.

Recently, an interest intending to increase QOS (quality of service) and QOE (quality of experience) is increasing in relation to a radio access network.

Hence, a structure of the radio access network is changing its form from a macro cell-based concentrated BS corresponding to a legacy vertical layer to a BS including a form that such various small cells as a pico cell, a femto cell and the like are interworking with the macro cell.

And, according to small cell enhancements for E-UTRAN, which corresponds to one of 3GPP ($3^{rd}$ generation partnership project) standardization categories, and E-UTRAN SI (study item), ongoing effort and discussion to enhance indoor/outdoor scenarios using low-power nodes are actively discussing.

Moreover, according to the small cell enhancements for E-UTRAN and the E-UTRAN SI (study item), a dual connectivity concept that a UE has connectivity with a macro cell layer and connectivity with a small cell layer at the same time is applying.

In consideration of the aforementioned trend, as various small cells are deployed in a radio access network environment, a user or UEs are physically situated at a network more closely.

Hence, it is required to introduce a logical cell-based service providing unit in an enhanced 5G ($5^{th}$ generation) radio access network to differentiate from a legacy physical cell-based service providing unit mainly concerning a BS. Hence, it is necessary to have a method of configuring the logical cell-based service providing unit.

SUMMARY OF THE INVENTION

Accordingly, the present invention is directed to an apparatus and method thereof that substantially obviate one or more problems due to limitations and disadvantages of the related art. One object of the present invention is to propose a method of performing communication, which is performed by a user equipment in a cloud radio access network environment.

Another object of the present invention is to propose a method of configuring a UE-based communication area as a logical cell-based service providing unit in a cloud radio access network environment.

Another object of the present invention is to propose a method of establishing an efficient connection between RRUs and a UE in a manner of determining the RRUs providing best connectivity to the UE in a radio access network environment in which an RRU and a BBU are implemented by being separated from each other.

Another object of the present invention is to provide an apparatus supporting the aforementioned methods.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method for a user equipment (UE) to perform a communication in a cloud radio access network environment, the method comprising: generating an RRU list based on signal strength of downlink signals received from each of one or more RRUs (remote resource unit), setting a UE-based communication area in a manner of transmitting the RRU list to a BBU (base band unit) via a first RRU among the one or more RRUs and establishing an RRC connection with a second RRU within the UE-based communication area.

According to the method of performing a communication, which is performed by a user equipment (UE) in a cloud radio access network environment, the UE can establish an RRC connection with a third RRU within the UE-based communication area without changing the BBU after the RRC connection with the second RRU within the UE-based communication area is established.

According to the method of performing a communication, which is performed by a user equipment (UE) in a cloud radio access network environment, the UE identifies one or more downlink signals including signal strength greater than a predetermined specific value among the received downlink signals, and the RRU list is generated in a manner of containing information on RRUs, which have transmitted the identified one or more downlink signals.

According to the method of performing a communication, which is performed by a user equipment (UE) in a cloud radio access network environment, each of the one or more RRUs can be connected with one or more BBUs and the connection can be performed via a backhaul network.

According to the method of performing a communication, which is performed by a user equipment (UE) in a cloud radio access network environment, each of the received downlink signals can include an RRU identification and a virtual cell identification. The RRU identification corresponds to an identification of an RRU, which has transmitted each of the downlink signals and the virtual cell identification corresponds to an identification of a BBU pool (virtual BBU server) including BBUs connected with the RRU, which has transmitted each of the downlink signals.

According to the method of performing a communication, which is performed by a user equipment (UE) in a cloud radio access network environment, the RRU list further transmitted to each of RRUs included in the RRU list via the first RRU.

According to the method of performing a communication, which is performed by a user equipment (UE) in a cloud radio access network environment, the UE camps on for each of RRUs contained in the RRU list, system information (SI) including information on a resource space status value and an access space status value of each of the RRUs can be received from each of the RRUs on which the UE camps on and an RRU including a greatest resource space status value and a greatest access space status value can be determined as the first RRU in a manner of comparing each of the received system information with each other.

According to the method of performing a communication, which is performed by a user equipment (UE) in a cloud radio access network environment, the second RRU can be determined by an RRU including a greatest resource space status value and a greatest access space status value in a manner that the BBU compares system information of each of RRUs included in the RRU list with each other and if there exist an RRU connected with the BBU and an RRU not connected with the BBU among the RRUs included in the RRU list, the comparison can be performed after the BBU obtains system information of the RRU not connected with the BBU in a manner of exchanging information with the RRU not connected with the BBU and the RRU connected with the BBU.

According to the method of performing a communication, which is performed by a user equipment (UE) in a cloud radio access network environment, each of the resource space status value and the access space status value can be represented by one of a high, a medium or a low value.

According to the method of performing a communication, which is performed by a user equipment (UE) in a cloud radio access network environment, the UE can establish the RRC connection with the second RRU in a manner of determining the first RRU as the second RRU.

To achieve these objects and other advantages and in accordance with the purpose of the invention, as embodied and broadly described herein, according to one embodiment, a user equipment (UE) performing a communication in a cloud radio access network environment includes a transmission unit, a reception unit and a processor configured to support a communication performance of the UE in a manner of being connected with the transmission unit and the reception unit, the processor configured to generate an RRU list based on signal strength of downlink signals received from each of one or more RRUs (remote resource unit), the processor configured to set a UE-based communication area in a manner of transmitting the RRU list to a BBU (base band unit) via a first RRU among the one or more RRUs, the processor configured to establish an RRC connection with a second RRU within the UE-based communication area.

According to the device of the present invention, establishing an RRC connection with a third RRU within the UE-based communication area can be performed without changing the BBU after the RRC connection with the second RRU within the UE-based communication area is established.

According to the device of the present invention, the processor is configured to identify one or more downlink signals including signal strength greater than a predetermined specific value among the received downlink signals, and the RRU list is generated in a manner of containing information on RRUs, which have transmitted the identified one or more downlink signals.

According to the device of the present invention, each of the one or more RRUs can be connected with one or more BBUs and the connection can be performed via a backhaul network.

According to the device of the present invention, each of the received downlink signals can include an RRU identification and a virtual cell identification. The RRU identification corresponds to an identification of an RRU, which has transmitted each of the downlink signals and the virtual cell identification corresponds to an identification of a BBU pool (virtual BBU server) including BBUs connected with the RRU, which has transmitted each of the downlink signals.

According to the device of the present invention, the RRU list further transmitted to each of RRUs included in the RRU list via the first RRU.

According to the device of the present invention, the processor is configured to perform a camp on for each of RRUs included in the RRU list, configured to receive system information (SI) including information on a resource space status value and an access space status value of each of the RRUs from each of the RRUs for which the camp on is performed, configured to determine an RRU including a greatest resource space status value and a greatest access space status value as the first RRU in a manner of comparing each of the received system information with each other.

According to the device of the present invention, the processor is configured to determine an RRU including a greatest resource space status value and a greatest access space status value as the second RRU in a manner of comparing system information of each of RRUs included in the RRU list with each other and if there exist an RRU connected with the BBU and an RRU not connected with the BBU among the RRUs included in the RRU list, the comparison can be performed after the BBU obtains system information of the RRU not connected with the BBU in a manner of exchanging information with the RRU not connected with the BBU and the RRU connected with the BBU.

According to the device of the present invention, each of the resource space status value and the access space status value can be represented by one of a high, a medium or a low value.

According to the device of the present invention, establishing the RRC connection with the second RRU can be performed in a manner of determining the first RRU as the second RRU.

According to the present invention, a UE can perform communication in a cloud radio access network environment.

According to the present invention, it is able to configure a UE-based communication area as a logical cell-based service providing unit in a cloud radio access network environment.

According to the present invention, it is able to determine RRUs providing best connectivity to a UE and establish an efficient connection between the determined RRUs and the UE in a radio access network environment in which an RRU and a BBU are implemented by being separated from each other.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings, reference numerals mean structural elements.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In the present application, such a terminology as 'comprise', 'include' and the like should be construed not as necessarily excluding various components or steps written in the present specification but as including the components or steps in part or further including additional components or steps.

And, such a terminology as 'unit' written in the present specification indicates a unit processing at least one function or an operation and can be implemented by hardware, software or a combination thereof. Moreover, "a or an", "one" or a similar related word can be used as a meaning including both a singular number and a plural number unless it is clearly contradicted to a context of the present invention.

Specific terminologies used in the following description are provided to help understand the present invention and the use of the specific terminologies can be modified into a different form in a range of not deviating from the technical idea of the present invention.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In the following description, a preferable embodiment according to the present invention is explained in detail with reference to the attached drawings. Detailed explanation to be explained with reference to attached drawings is intended to show not a unique embodiment but an exemplary embodiment of the present invention.

Figure 1:
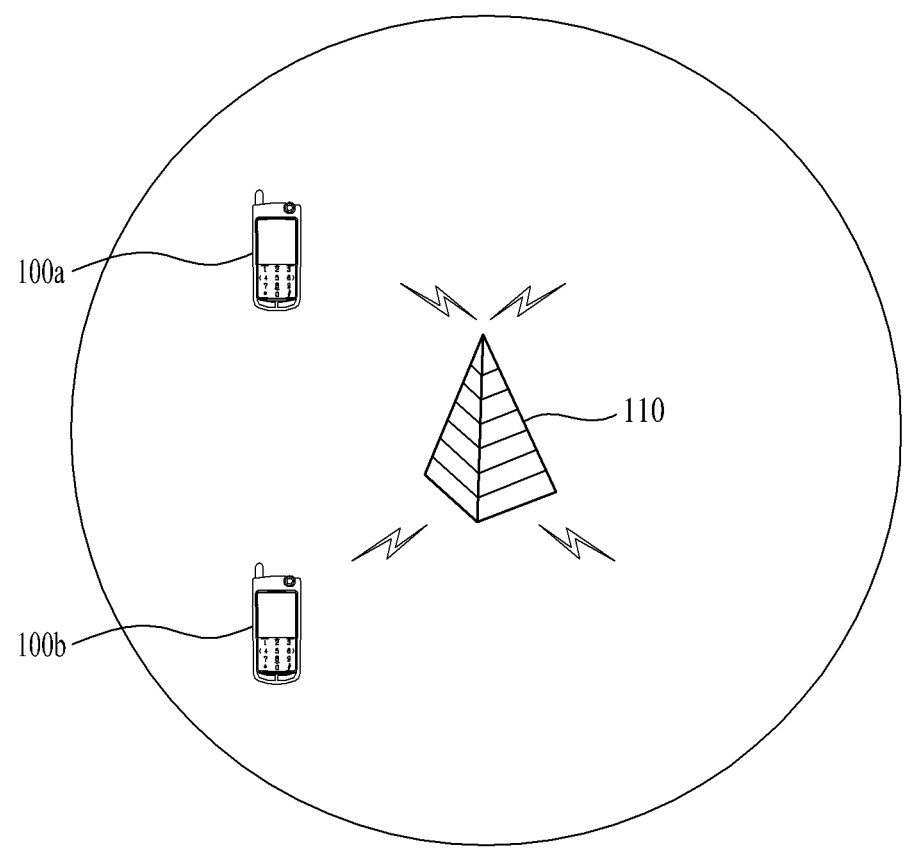
FIG. 1 is a diagram for an example of a general radio access network system to which the present invention is applicable.

FIG. 1 is a diagram for an example of a general radio access network system to which the present invention is applicable.

FIG. 1 shows a general radio access network system to which the present invention is applicable. The radio access network system can include a base station (BS) 110 and one or more user equipments (UE) 100a/100b.

In the present invention, a base station 110 may be meaningful as a terminal node of a network which directly performs communication with the user equipment 100a/100b. In this disclosure, a specific operation explained as performed by a base station may be performed by an upper node of the base station in some cases.

In particular, in a network constructed with a plurality of network nodes including a base station 110, it is apparent that various operations performed for communication with a user equipment can be performed by a base station or other network nodes except the base station.

In the present invention, 'base station (BS) 110' may be substituted with such a terminology as a fixed station, a Node B, an eNode B (eNB), an access point (AP) and the like.

And, a 'user equipment' 100a/100b may be substituted with such a terminology as a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

Embodiments of the present invention can be implemented in at least one of wireless access systems including IEEE 802 system, 3GPP system, 3GPP LTE and LTE-A (LTE-Advanced) system and 3GPP2 system and at least one of the embodiments may be supported by the disclosed standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution).

Figure 2:
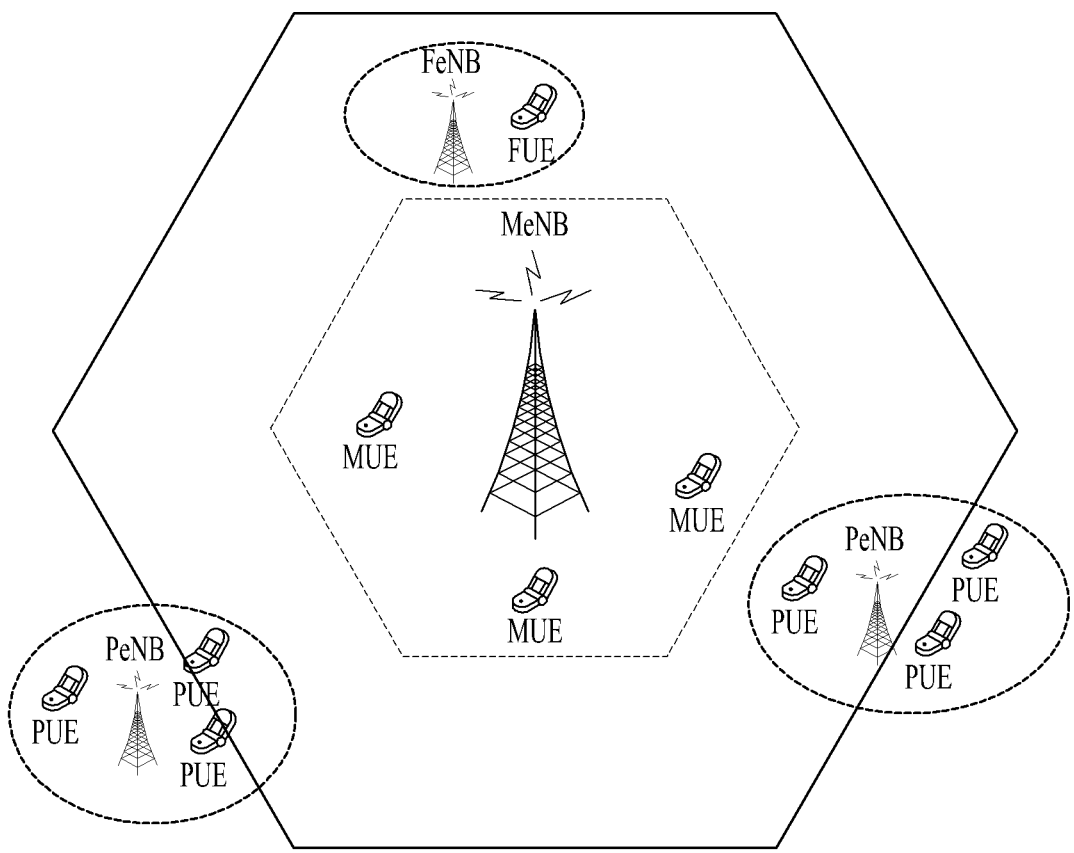
FIG. 2 is a diagram for a heterogeneous network environment to which the present invention is applicable.

OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. FIG. 2 is a diagram for a heterogeneous network environment to which the present invention is applicable.

As mentioned in the foregoing description, in order to more stably secure a data service such as multimedia and the like in a next generation radio access network, an interest in a hierarchical cell structure in which a macro cell-based homogeneous network and a small cell (e.g., pico cell or femto cell) used for a low-power/short-range communication coexist or a heterogeneous cell structure is increasing. This is because if a macro cell base station is additionally installed, it is inefficient in terms of cost and complexity when considering whether a system performance is improved.

Meanwhile, a structure of a heterogeneous network considered by a radio access network can be structured by a form depicted in FIG. 2. A plurality of small cells coexist in a single macro cell. Each of a plurality of the small cells services user equipments in a manner of being allocated a resource according to a cell coordination scheme.

Figure 3:
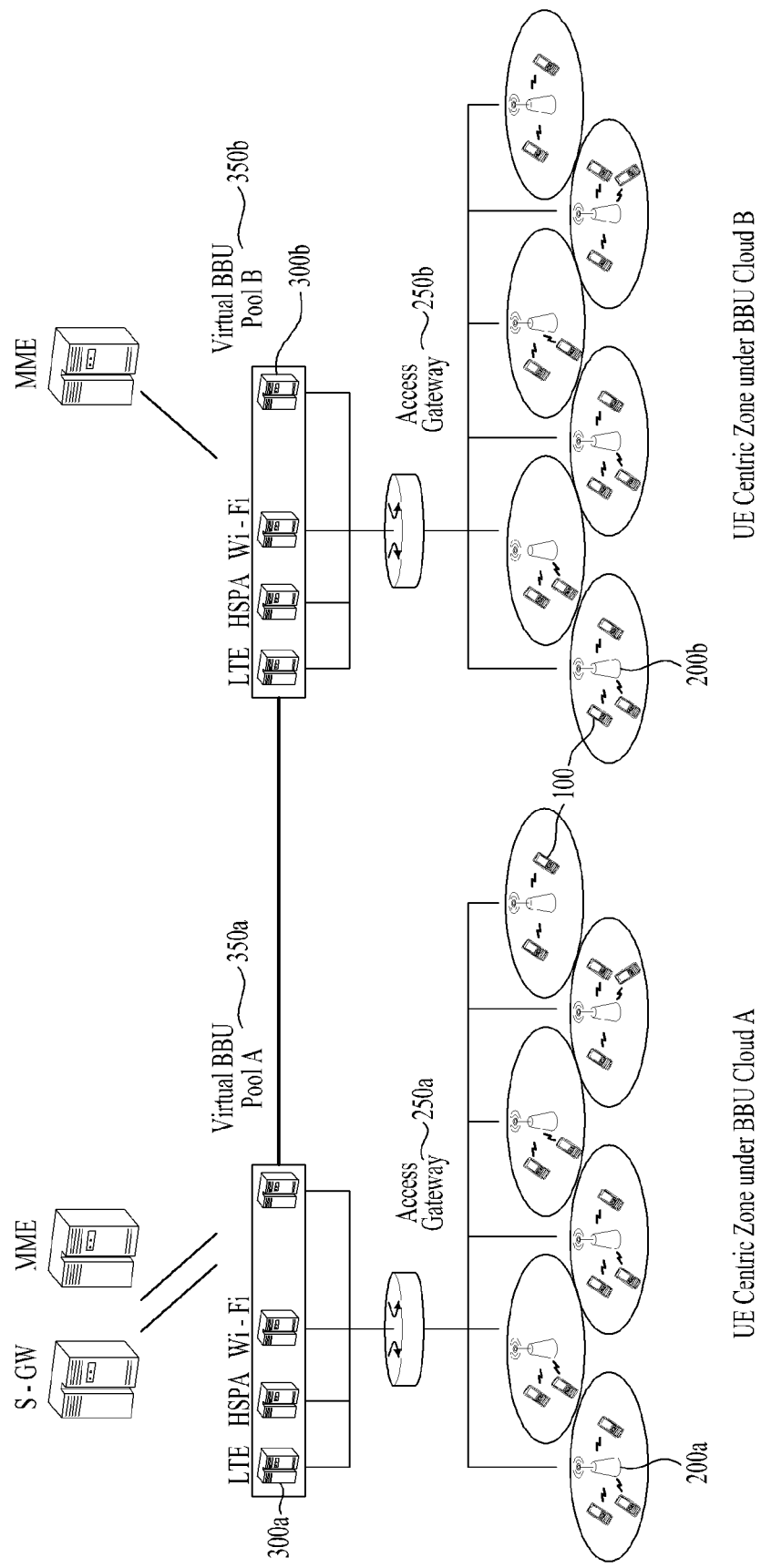
FIG. 3 is a diagram for a cloud radio access network environment to which the present invention is applicable.

One of core technologies designed to implement the heterogeneous network environment corresponds to a separate implementation of an RRU and a BBU. The separate implementation of the RRU and the BBU shall be described in detail with reference to FIG. 3 in the following together with a cloud RAN environment. FIG. 3 is a diagram for a cloud radio access network environment to which the present invention is applicable.

Conventionally, there exists a physical cell and a user or user equipments access the physical cell to receive a service. On the contrary, as mentioned in the foregoing description, the cloud radio access network (C-RAN) environment corresponds to an environment that constructs a logical zone capable of providing an optimized communication environment according to a user and provides a service based on the logical zone.

A method of performing communication performed by a user equipment according to one embodiment of the present invention can be applied to the cloud radio access network environment depicted in FIG. 3. In the following, the cloud radio access network environment is explained in more detail with reference to FIG. 3.

As shown in FIG. 3, the cloud radio access network environment can include a plurality of RRUs 200a/200b, a software-based virtual BBU pool 350a/350b or virtual base station (VBS), access control/resource management/authentication server and the like.

In the cloud radio access network environment, as core network elements are changing to an open IP (internet protocol) network, many elements of the cloud radio access network environment are directly interworking with the elements of the core network in an organic relation. A main characteristics of the cloud radio access network environment is separation between the RRU 200a/200b and the BBU 300a/300b. According to the separation between the RRU and the BBU, the cloud radio access network environment can be implemented as follows.

First of all, there exist virtual BBU pools 350a, 350b and the virtual BBU pools include a plurality of BBUs 300a and 300b. The virtual BBU pools 350a, 350b includes a structure linked to SAS (shared antenna system) RRUs 200a, 200b supporting a Multi-RAT (multi radio access technology) via various linking methods including an access gateway (GW) 250a, 250b.

The virtual BBU pools 350a, 350b include a plurality of BBUs 300a, 300b supporting various radio access technologies. One RRU 200a/200b can be linked to one or more BBUs 300a, 300b. On the contrary, one BBU 300a/300b can be linked to one or more RRUs 200a, 200b.

The BBUs 300a, 300b within the virtual BBU pool 350a, 350b can be connected with the RRUs 200a, 200b via an ideal/non-ideal backhaul. One virtual BBU pool 350a can be connected with another BBU pool 350b via an X2 interface or an interface similar to the X2 interface.

Secondly, all RRUs 200a, 200b within the virtual BBU pools 350a, 350b have an identical virtual cell ID. All BBUs 300a, 300b and all RRUs 200a, 200b within the virtual BBU pools 350a, 350b are connected via an ideal backhaul. Hence, the RRU 200a/200b is controlled by the BBU 300a/300b connected with the RRU.

Thirdly, a sync signal or a downlink signal used for obtaining downlink sync is transmitted by each of the RRUs 200a, 200b. The sync signal can include not only a virtual cell ID of a BBU pool (a virtual BBU server) including the virtual BBUs 350a, 350b, 300a and 300b to which each of the RRUs 200a, 200b belongs or connected but also an RRU ID capable of identifying each of the RRUs 200a, 200b.

Fourthly, assume that each of the RRUs 200a, 200b is an antenna and L1/L2/L3 layer processing is performed by the BBUs 300a, 300b existing in the BBU pools 350a, 350b. And, the RRUs 200a, 200b have an attribute of a SAS (shared antenna system). This indicates that the RRUs 200a, 200b can change its affiliation from one BBU to a different BBU within the virtual BBU pool 350a, 350b.

In particular, variable affiliation of the RRU 200a, 200b can be modified from one BBU to a different BBU according to a situation (e.g., load of a BBU, available resource situation and the like) of the BBU 300a, 300b.

Figure 4:
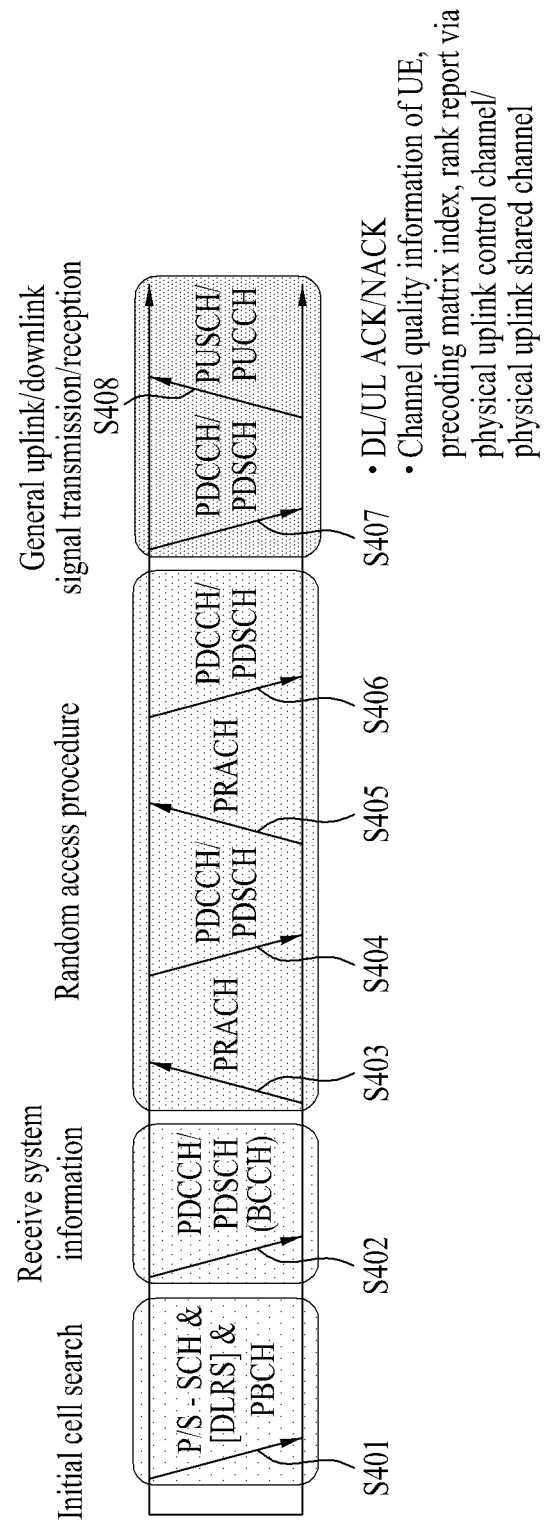
FIG. 4 is a diagram for explaining physical channels used for 3GPP LTE system and a general signal transmission method using the physical channels capable of being used in the present invention.

FIG. 4 is a diagram for explaining physical channels used for 3GPP LTE system and a general signal transmission method using the physical channels capable of being used in the present invention.

Referring to FIG. 4, if a power of a user equipment is turned on again from a power off state or the user equipment enters a new cell, the user equipment may perform an initial cell search job for matching synchronization with a base station and the like [S401]. To this end, the user equipment may receive a primary synchronization channel (P-SCH) and a secondary synchronization channel (S-SCH) from the base station, may be synchronized with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and information carried on the physical downlink control channel (PDCCH). The user equipment may be then able to obtain more detailed system information [S402].

Subsequently, the user equipment may be able to perform a random access procedure to complete the access to the base station [S403 to S406]. To this end, the user equipment may transmit a preamble on a physical random access channel (PRACH) [S403] and may be then able to receive a response message on PDCCH and the corresponding PDSCH in response to the preamble [S404]. In case of a contention-based random access, the user equipment can additionally transmit a PRACH signal [S405]. According to one embodiment of the present invention, the user equipment can transmit the PRACH signal in a manner of including a request for establishing an RRC connection with an RRU in the PRACH signal.

Meanwhile, a contention resolution procedure such as reception of a PDCCH signal and reception of a PDSCH signal corresponding to the PDCCH signal can be performed in response to the step S405.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 5:
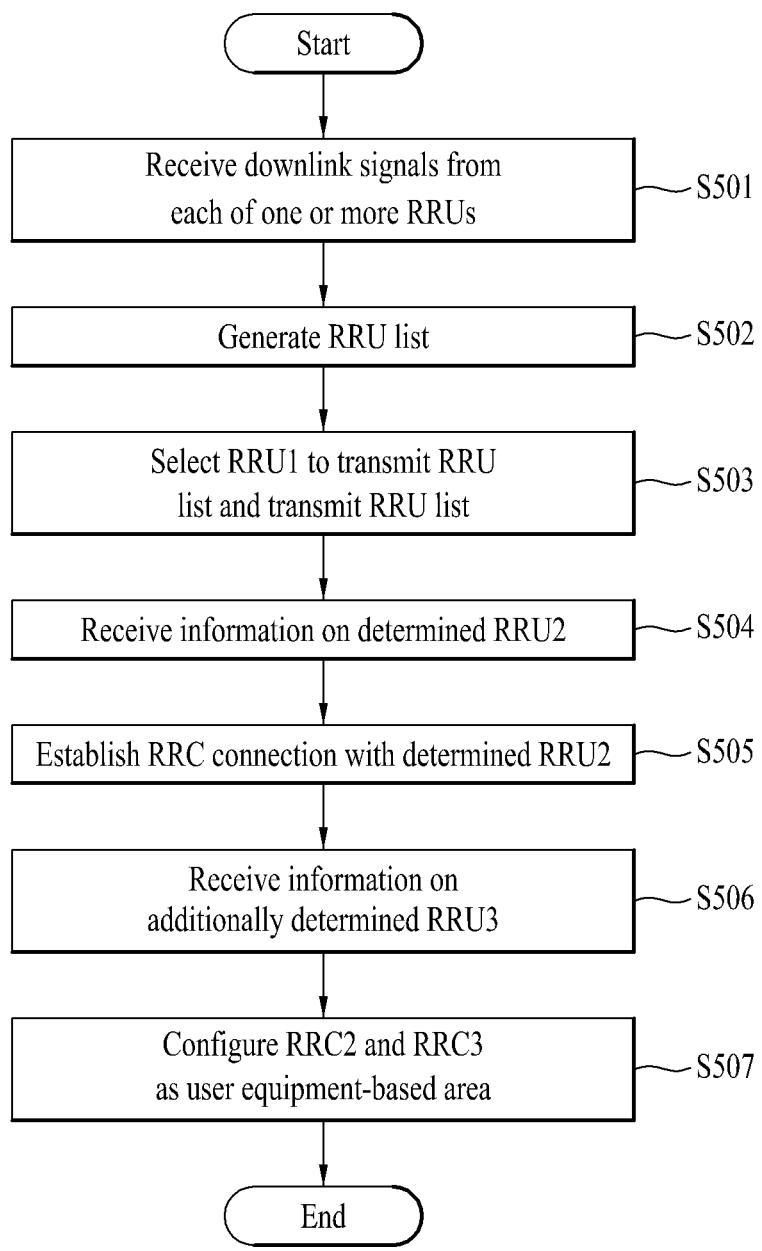
FIG. 5 is a flowchart for explaining a method of configuring a UE-based communication area according to one embodiment of the present invention.

FIG. 5 is a flowchart for explaining a method of configuring a UE-based communication area according to one embodiment of the present invention.

Referring to FIG. 5, a user equipment in a cloud radio access network environment can receive downlink signals from each of one or more RRUs [S501].

Figure 8:
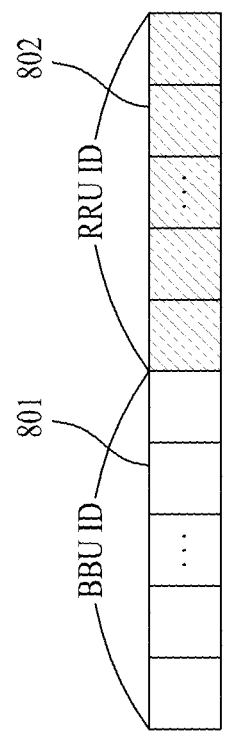
FIG. 8 is a diagram for an example of a BBU ID and an RRU ID included in a downlink signal received by a UE according to one embodiment of the present invention.

The downlink signal includes all kinds of sync signals transmitted by the one or more RRUs to obtain synchronization with the user equipment. As depicted in FIG. 8, each downlink signal can include each identification (ID) 802 of one or more RRUs which has transmitted the downlink signal or an ID 801 of a BBU pool (virtual BBU server) including BBUs to which each of the RRUs belongs or is connected.

Meanwhile, having received the downlink signals from each of one or more RRUs, the user equipment identifies a downlink signal including signal strength greater than a predetermined specific value based on the signal strength of the received downlink signals and generates an RRU list (radio remote unit list) using the identified downlink signal [S502].

In particular, the user equipment can compare signal strength, connection state, signal quality, radio quality and the like capable of being measured from the received downlink signals with a predetermined prescribed threshold. Subsequently, the user equipment identifies one or more downlink signals in which the signal strength, the connection state, the signal quality, or the radio quality is greater than the predetermined threshold and can generate the RRU list in a manner of including the RRUs, which have transmitted the one or more identified downlink signals, in the RRU list.

In this case, information on the RRUs included in the RRU list may become a reference signal to identify the RRUs. For instance, the RRU list can be implemented by an RRU specific reference signal (RRS) including a form similar to a cell specific signal (CRS). On the other hand, the RRU list can be implemented by an ID of the RRU, which is likely to be included in the received downlink signal.

Meanwhile, the user equipment selects an RRU including best signal strength, best connection state, or best radio quality from the RRUs included in the RRU list and can transmit the RRU list generated in the step S502 to the selected RRU [S503].

Subsequently, the user equipment can receive an RRU, which is determined as an optimal RRU to establish a connection with the user equipment among the RRUs included in the RRU list, from the RRU to which the RRU list is transmitted by the user equipment in the step S502 [S504]. In this case, the user equipment can directly receive information on the RRU determined as the optimal RRU to establish a connection with the user equipment from the RRU determined as the optimal RRU to establish a connection with the user equipment instead of the RRU to which the RRU list is transmitted by the user equipment.

In this case, the RRU to which the RRU list is transmitted by the user equipment transmits the RRU list to a BBU to which the RRU belongs or is connected. And then, the BBU may determine an RRU as the optimal RRU to establish a connection with the user equipment based on the received RRU list. And, the BBU transmits information on the determined RRU to the RRU, which has transmitted the RRU list to the BBU, and the RRU, which has transmitted the RRU list to the BBU, can transmit the information on the determined RRU to the user equipment. And, the BBU can transmit not only the information (e.g., RRU ID, etc.) on the determined RRU but also a command for establishing an RRC connection with the determined RRU.

Meanwhile, the user equipment establishes an RRC (radio resource control) connection with the RRC determined as the optimal RRU [S505]. In this case, the user equipment can transmit a request for establishing the RRC connection with the RRU determined as the optimal RRU in a manner of including the request in a third message among the random access procedures. In this case, the RRC connection corresponds to a connection enabling an RRC layer, which is situating at a lowest of a third layer among 7 layers of an open system interconnection (OSI) reference model widely known to a communication system, to transceive a message, data or the like with an RRC layer of a base station including an RRU of the present invention.

After the user equipment has established the RRC connection with the determined RRU in the step S505, the BBU determines an additional RRU among the RRUs included in the RRU list except the determined RRU according to a necessity and can transmit information on the additional RRU to the user equipment [S506].

Having received the information on the additional RRU, the user equipment can establish the RRC connection with the additional RRU. This may be named a user equipment-based communication area [S507]. In this case, the user equipment-based communication area can be configured in a manner of including the RRU, which has preferentially performed the RRC connection, and the additional RRU, which has additionally performed the RRC connection [S507].

In particular, unlike a physical cell-based service providing unit where the base station becomes a center, the user equipment-based communication area configured by the user equipment in the step S507 is a logical cell-based service providing unit where the user equipment becomes a center.

After establishing the RRC connection with the determined RRU in the user equipment-based communication area, the user equipment 100 can establish the RRC connection with the additional RRU in the user equipment-based communication area without changing the BBU. By doing so, the user equipment can maintain double connectivity.

Figure 6:
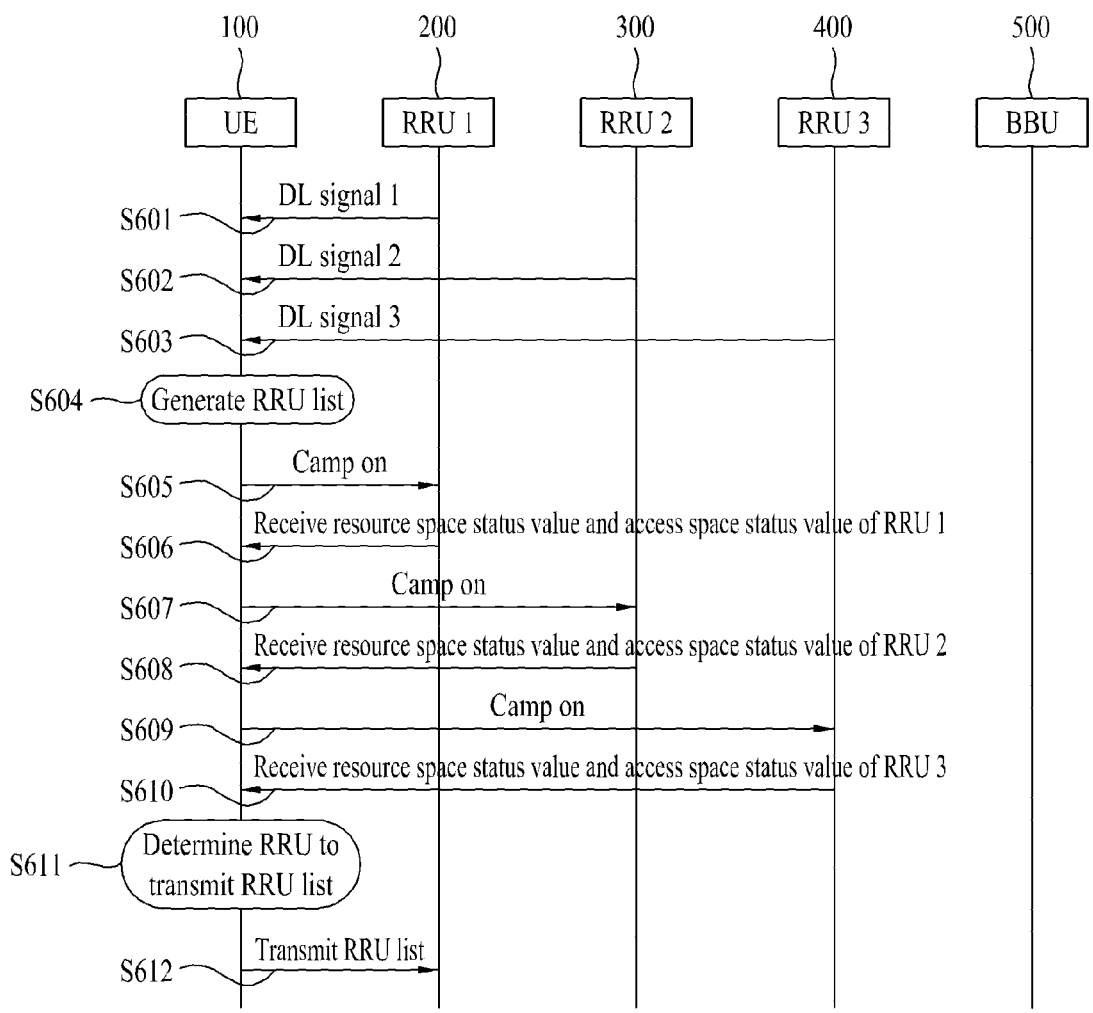
FIG. 6 is a flowchart for an example of determining an RRU used for a UE to transmit an RRU list according to one embodiment of the present invention.

FIG. 6 is a flowchart for an example of determining an RRU used for a UE to transmit an RRU list according to one embodiment of the present invention.

Referring to FIG. 6, assume that the cloud radio access network environment to which the present invention is applicable includes a user equipment (UE) 100, an RRU1 200, an RRU2 200, an RRU3 300 and a BBU 500 connected with the RRU1, the RRU2 and the RRU3.

Referring to FIG. 6, the UE 100 within the cloud radio access network environment can receive downlink signals from each of one or more RRUs (the RRU1, the RRU2 and the RRU3 200, 300 and 400) [S601, S602 and S603].

The downlink signal includes all kinds of sync signals transmitted by the one or more RRUs 200, 300 and 400 to obtain synchronization with the user equipment 100. As depicted in FIG. 8, each downlink signal can include each identification (ID) 802 of one or more RRUs 200, 300 and 400 which have transmitted the downlink signal and an ID 801 of a BBU pool (virtual BBU server) including BBUs 500 to which each of the RRUs belongs or is connected.

Meanwhile, having received the downlink signals from each of one or more RRUs 200, 300 and 400, the user equipment 100 identifies a downlink signal including signal strength greater than a predetermined specific value based on the signal strength of the received downlink signals and generates an RRU list (radio remote unit list) using the identified downlink signal [S604].

In particular, the user equipment 100 can compare signal strength, connection state, signal quality, radio quality and the like capable of being measured from the received downlink signals with a predetermined prescribed threshold. Subsequently, the user equipment 100 identifies one or more downlink signals in which the signal strength, the connection state, the signal quality, or the radio quality is greater than the predetermined threshold and can generate the RRU list in a manner of including the RRUs, which have transmitted the one or more identified downlink signals, in the RRU list.

For clarity, assume that all RRUs including the RRU1 200, the RRU2 300 and the RRU3 400 have transmitted the downlink signal with the signal strength greater than the predetermined threshold and the all RRUs including the RRU1 200, the RRU2 300 and the RRU3 400 are included in the RRU list in the following description.

And, information on the RRUs included in the RRU list may become a reference signal to identify the RRUs. For instance, the RRU list can be implemented by an RRU specific reference signal (RRS) including a form similar to a cell specific signal (CRS). On the other hand, the RRU list can be implemented by an ID of the RRU included in the received downlink signal.

Meanwhile, the user equipment 100 can transmit the RRU list generated in the step S604 to a random RRU including best signal strength, best connection state, or best radio quality among the RRUs 200, 300 and 400 included in the RRU list. To this end, the user equipment 100 can determine the random RRU including best signal strength, best connection state, or best radio quality among the RRUs 200, 300 and 400 included in the RRU list without an additional checking procedure with a BBU or a different network stage. By doing so, the user equipment 100 can perform a camp on to each of the RRUs 200, 300 and 400 included in the RRU list [S605, S607 and S609].

Although FIG. 6 shows that the user equipment 100 sequentially perform an access to each of the RRUs 200, 300 and 400 included in the RRU list, an order of accessing each of the RRUs may change. On the other hand, the user equipment 100 can access all of the RRUs 200, 300 and 400 at the same time.

Meanwhile, having accessed the RRUs 200, 300 and 400 included in the RRU list, the user equipment 100 can receive information on a resource space status value and an access space status value of each of the RRUs 200, 300 and 400 from each of the RRUs 200, 300 and 400 [S606, S608 and S610].

Although FIG. 6 shows that the user equipment 100 receives the information on the resource space status value and the access space status value of each of the RRUs 200, 300 and 400 according to the order of accessing each of the RRUs 200, 300 and 400, an order of receiving the information may change. On the other hand, the user equipment 100 can receive the information on the resource space status value and the access space status value from each of the RRUs 200, 300 and 400 at the same time.

And, the resource space status value and the access space status value can be received in a manner of being included in system information of a corresponding RRU or a physical channel receivable by the user equipment 100 from a corresponding RRU. And, when the resource space status value and the access space status value are received, such different information on the corresponding RRU such as information on signal strength and the like can be received together in a manner of being included in the resource space status value and the access space status value.

The resource space status value and the access space status value can be represented as good, fair or poor or high, medium or low according to a predetermined reference value. The representation can be modified according to a setting.

Meanwhile, having received the resource space status value and the access space status value from each of the RRUs 200, 300 and 400 included in the RRU list, the user equipment 100 can select a random RRU, which is determined as an RRU including best signal strength, best connection state or best radio quality, in a manner of comparing the received values with each other [S611]. In the present embodiment, assume that the RRU1 200 corresponds to the random RRU including best signal strength, best connection state or best radio quality.

Subsequently, the user equipment 100 can transmit the RRU list generated in the step S604 to the selected random RRU1 200 [S612]. Although it is not depicted in FIG. 6, if the user equipment performs a camp on to each of the RRUs in the step S605, the step S607 and the step S609, the user equipment may directly establish an RRC connection with a random RRU, which is determined as an RRU including best signal strength, best connection state or best radio quality, without transmitting the RRU list to the random RRU as shown in the step S612.

Figure 7:
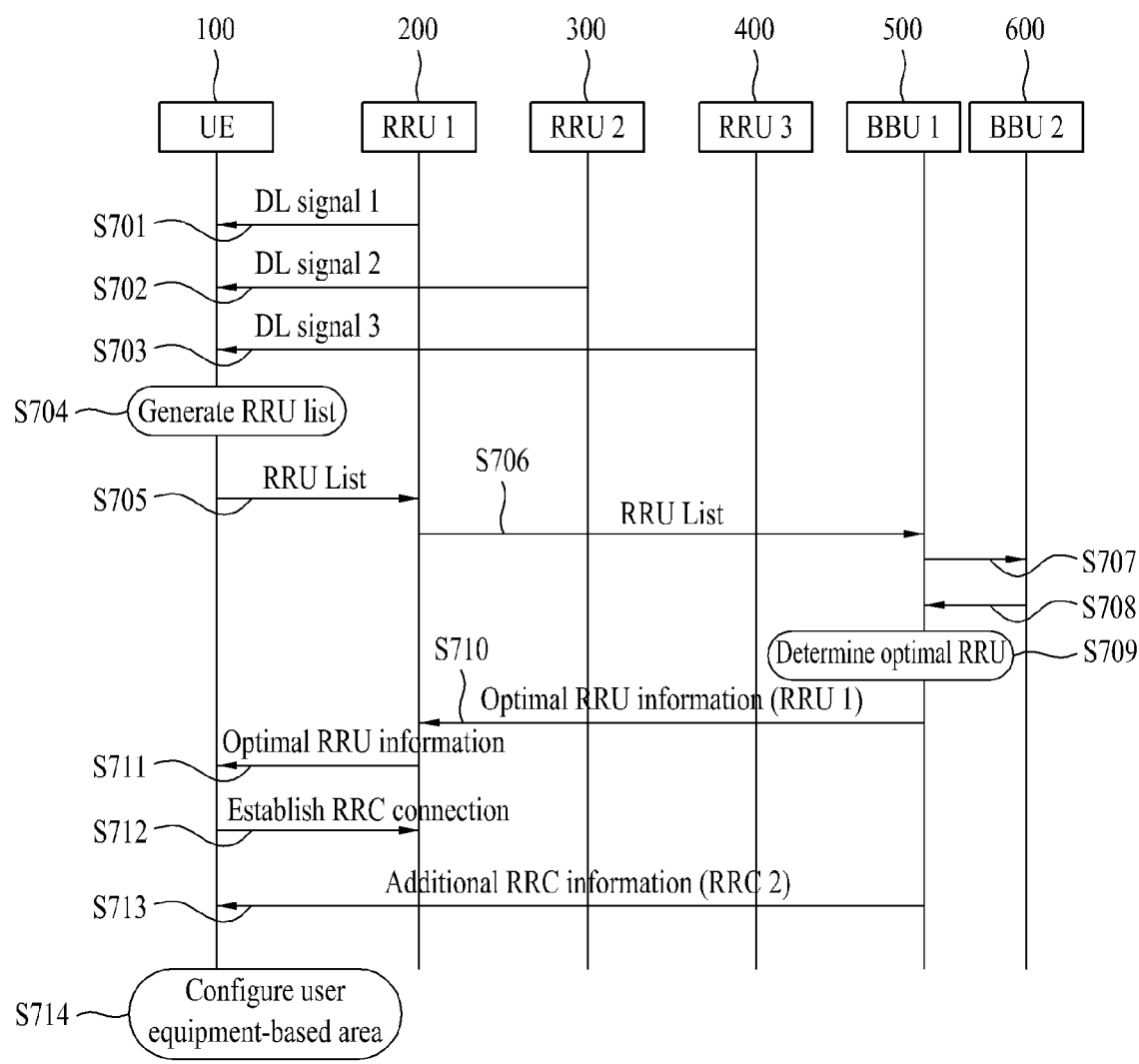
FIG. 7 is a flowchart for an example of a method of configuring a UE-based communication area according to one embodiment of the present invention.

FIG. 7 is a flowchart for an example of a method of configuring a UE-based communication area according to one embodiment of the present invention.

Referring to FIG. 7, assume that the cloud radio access network environment to which the present invention is applicable includes a user equipment (UE) 100, an RRU1 200, an RRU2 200, an RRU3 300, a BBU1 500 connected with the RRU1 and the RRU2 and a BBU2 600 connected with the RRU3.

Referring to FIG. 7, the UE 100 within the cloud radio access network environment can receive downlink signals from each of one or more RRUs (the RRU1, the RRU2 and the RRU3 200, 300 and 400) [S701, S702 and S703].

The downlink signal includes all kinds of sync signals transmitted by the one or more RRUs 200, 300 and 400 to obtain synchronization with the user equipment 100. As depicted in FIG. 8, each downlink signal can include each identification (ID) 802 of one or more RRUs 200, 300 and 400 which have transmitted the downlink signal and an ID 801 of a BBU pool (virtual BBU server) including BBUs 500 to which each of the RRUs belongs or is connected.

Meanwhile, having received the downlink signals from each of one or more RRUs 200, 300 and 400, the user equipment 100 identifies a downlink signal including signal strength greater than a predetermined specific value based on the signal strength of the received downlink signals and generates an RRU list (RRU preference list) using the identified downlink signal [S704].

In particular, the user equipment 100 can compare signal strength, connection state, signal quality, radio quality and the like capable of being measured from the received downlink signals with a predetermined prescribed threshold. Subsequently, the user equipment 100 identifies one or more downlink signals in which the signal strength, the connection state, the signal quality, or the radio quality is greater than the predetermined threshold and can generate the RRU list in a manner of including the RRUs, which have transmitted the one or more identified downlink signals, in the RRU list.

For clarity, assume that all RRUs including the RRU1 200, the RRU2 300 and the RRU3 400 have transmitted the downlink signal with the signal strength greater than the predetermined threshold and the all RRUs including the RRU1 200, the RRU2 300 and the RRU3 400 are included in the RRU list in the following description.

And, information on the RRUs included in the RRU list may become a reference signal to identify the RRUs. For instance, the RRU list can be implemented by an RRU specific reference signal (RRS) including a form similar to a cell specific signal (CRS). On the other hand, the RRU list can be implemented by an ID of the RRU included in the received downlink signal.

Meanwhile, the user equipment 100 can transmit the RRU list generated in the step S704 to a random RRU including best signal strength, best connection state, or best radio quality among the RRUs 200, 300 and 400 included in the RRU list [S705].

In order for the user equipment to determine an RRU including best signal strength, best connection state or best radio quality among the RRUs included in the RRU list, the user equipment can determine a random RRU according to the operation mentioned earlier in FIG. 6.

In embodiment of the present invention, assume that the RRU1 200 corresponds to the RRU including best signal strength, best connection state or best radio quality among the RRUs included in the RRU list.

Meanwhile, having received the RRU list generated in the step S704 from the user equipment 100, the RRU1 200 can transmit the RRU list to the BBU 1 500 which is connected with the RRU1 200 [S706]. Although it is not depicted in the drawing, the RRU1 200 may transmit the RRU list to such different RRUs included in the RRU list as the RRU2 300 and the RRU3 400 to share information with the different RRUs.

Having received the RRU list from the RRU1 200, the BBU1 500 determines whether the RRUs 200, 300 and 400 included in the received RRU list correspond to RRUs connected with the BBU 500 and whether there exist an RRU connected with a different BBU2 600. If there exists an RRU 400 connected with the different BBU2 600 and the BBU1 500 is unable to know information on a resource space status value and an access space status value of the RRU 400, which is connected with the different BBU2 600, the BBU1 can make a request for the information on the resource space status value and the access space status value of the RRU 400 to the different BBU2 600 [S707]. The BBU1 can receive the information on the resource space status value and the access space status value of the RRU 400 from the different BBU2 600 in response to the request [S708]. Although it is not depicted in the drawing, the BBU1 500 stores information on a resource space status value and an access space status value of the RRUs 200, 300 connected with the BBU1 in a manner of periodically measuring or updating the information.

The resource space status value and the access space status value can be represented as good, fair or poor or high, medium or low according to a predetermined reference value. The representation can be modified according to a setting.

And, the resource space status value and the access space status value can be transmitted in a manner of being included in a physical channel capable of being received by the BBU1 500 from the BBU2 600 which is connected with the RRU 400. And, such different information on the RRU 400 as information on signal strength and the like can be included together with the resource space status value and the access space status value.

Meanwhile, the BBU1 500 compares the resource space status value and the access space status value of each of the RRUs 200, 300 and 400 included in the RRU list with each other and can determine an optimal RRU determined as an RRU including best signal strength, best connection state or best radio quality [S709] and can transmit information on the determined optimal RRU to the RRU 200, which has transmitted the RRU list to the BBU1 in the step S706 [S710].

In this case, the optimal RRU, which is determined by the BBU1 500, may be or may be not identical to the RRU1 200, which is determined as the RRU including best signal strength, best connection state or best radio quality in the step S705 by the user equipment 100. For clarity, assume that the RRU 200 determined in the step S709 and the optimal RRU determined in the step S705 correspond to an identical RRU, i.e., the RRU1 200 in the present specification and FIG. 7.

And, the information on the optimal RRU transmitted to the RRU1 200 by the BBU1 500 in the step S710 may become a prescribed reference signal to identify the optimal RRU. On the other hand, the information on the optimal RRU can be implemented by an ID of the optimal RRU.

Having received the information on the determined optimal RRU from the BBU1 500, the RRU1 200 transmits the received information on the optimal RRU to the user equipment 100 [S711].

Having received the information on the optimal RRU from the RRU1 200, the user equipment 100 can establish an RRC connection with the optimal RRU. As mentioned in the foregoing description, since the present embodiment assumes that the optimal RRU corresponds to the RRU1 200, the user equipment 100 establishes the RRC connection with the RRU1 200 [S712]. In this case, the user equipment can transmit a request for establishing the RRC connection with the optimal RRU in a manner of including the request in a third message among the random access procedures.

In this case, the RRC connection corresponds to a connection enabling an RRC layer, which is situating at a lowest of a third layer among 7 layers of an open system interconnection (OSI) reference model widely known to a communication system, to transceive a message, data or the like with an RRC layer of a base station including an RRU of the present invention.

After the user equipment has established the RRC connection with the optimal RRU 200 in the step S712, the BBU1 500 determines an additional RRU among the RRUs 200, 300 and 400 included in the RRU list except the determined optimal RRU according to a necessity and can transmit information on the additional RRU to the user equipment 100 [S713]. In the present embodiment, assume that the additional RRU is determined by the RRU2 300.

Having received the information on the additional RRU, the user equipment can establish the RRC connection with the additional RRU. This may be named a user equipment-based communication area. In this case, the user equipment-based communication area can be configured in a manner of including the RRU, which has preferentially established the RRC connection, and the additional RRU [S714].

In particular, unlike a physical cell-based service providing unit where the base station becomes a center, the user equipment-based communication area configured by the user equipment in the step S714 is a logical cell-based service providing unit where the user equipment becomes a center.

After establishing the RRC connection with the determined RRU in the user equipment-based communication area, the user equipment 100 can establish the RRC connection with the additional RRU in the user equipment-based communication area without changing the BBU. By doing so, the user equipment can maintain double connectivity.

FIG. 8 is a diagram for an example of a BBU ID and an RRU ID included in a downlink signal received by a UE according to one embodiment of the present invention.

FIG. 8 shows a downlink signal received from each of one or more RRUs by a user equipment in the step S601 to S603 in FIG. 6 and in the step S701 to S703 in FIG. 7 and an ID of a BBU pool (virtual BBU server) including BBUs and an ID of an RRU included in the downlink signal.

The downlink signal, which is received from one or more RRUs, includes all kinds of sync signals transmitted by the one or more RRUs 200, 300 and 400 to obtain synchronization with the user equipment 100. As depicted in FIG. 8, each downlink signal can include each identification (ID) 802 of one or more RRUs 200, 300 and 400 which have transmitted the downlink signal and an ID 801 of a BBU pool (virtual BBU server) including BBUs 500 to which each of the RRUs is connected.

Figure 9:
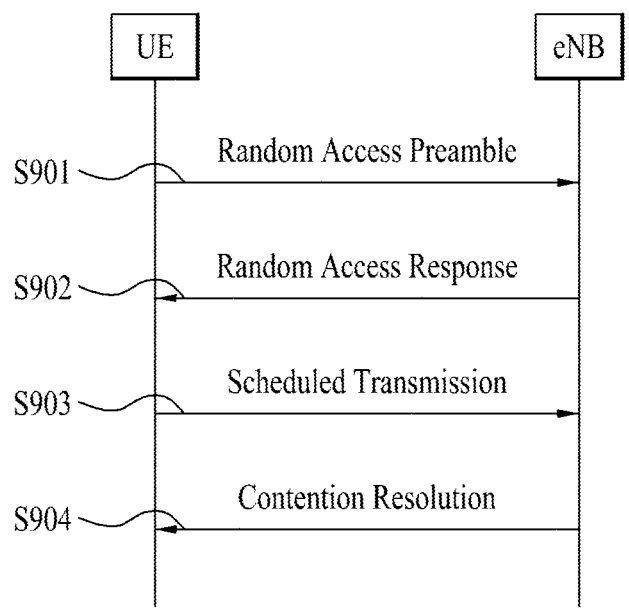
FIG. 9 is a flowchart for explaining an operation procedure between a UE and a BS in a contention-based random access procedure capable of being used by the present invention.

FIG. 9 is a flowchart for explaining an operation procedure between a UE and a BS in a contention-based random access procedure capable of being used by the present invention.

Although FIG. 9 shows a contention-based random access procedure, it is apparent that the random access procedure usable in the present invention can be applied to not only the contention-based random access procedure disclosed in FIG. 9 but also a non-contention-based random access procedure or an added or reduced random access procedure capable of being improved in the future.

(1) 1st Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S901].

(2) 2nd Message Reception

After the user equipment has transmitted the random access preamble, the user equipment attempts a reception of its random access response in a random access response receiving window indicated by a base station through the system information or the handover command [S902]. In particular, the random access response information may be transmitted in format of MAC PDU. And, the MAC PDU may be carried on PDSCH (physical downlink shared channel). In order to properly receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S902. Through this, the user equipment may be able to receive a UL grant, a temporary cell identifier (temporary C-RNTI), time synchronization correction value (timing advance command: TAC) and the like.

(3) 3rd Message Transmission

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a 3rd message) to the base station [S903]. In the contention-based random access procedure, a base station is unable to determine which user equipments perform the random access procedure. In order for resolve the contention later, the base station needs to identify a user equipment.

As a method of including an identifier of a user equipment, two kinds of methods have been discussed. According to a 1st method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) 4th Message Reception

After the user equipment has transmitted the data including its identifier via the UL grant included in the random access response, the user equipment waits for an instruction from the base station for the contention resolution. In particular, the user equipment may attempt a reception of PDCCH to receive a specific message [S904]. As a method of receiving the PDCCH, two kinds of methods have been discussed. As mentioned in the foregoing description, if the 3rd message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, if the contention resolution procedure via the aforementioned third message transmission and the fourth message reception is not successful, the user equipment can restart the random access procedure by selecting a further different random access preamble. Hence, the user equipment receives the second message from the base station and can transmit the third message to the base station for the contention resolution procedure.

Figure 10:
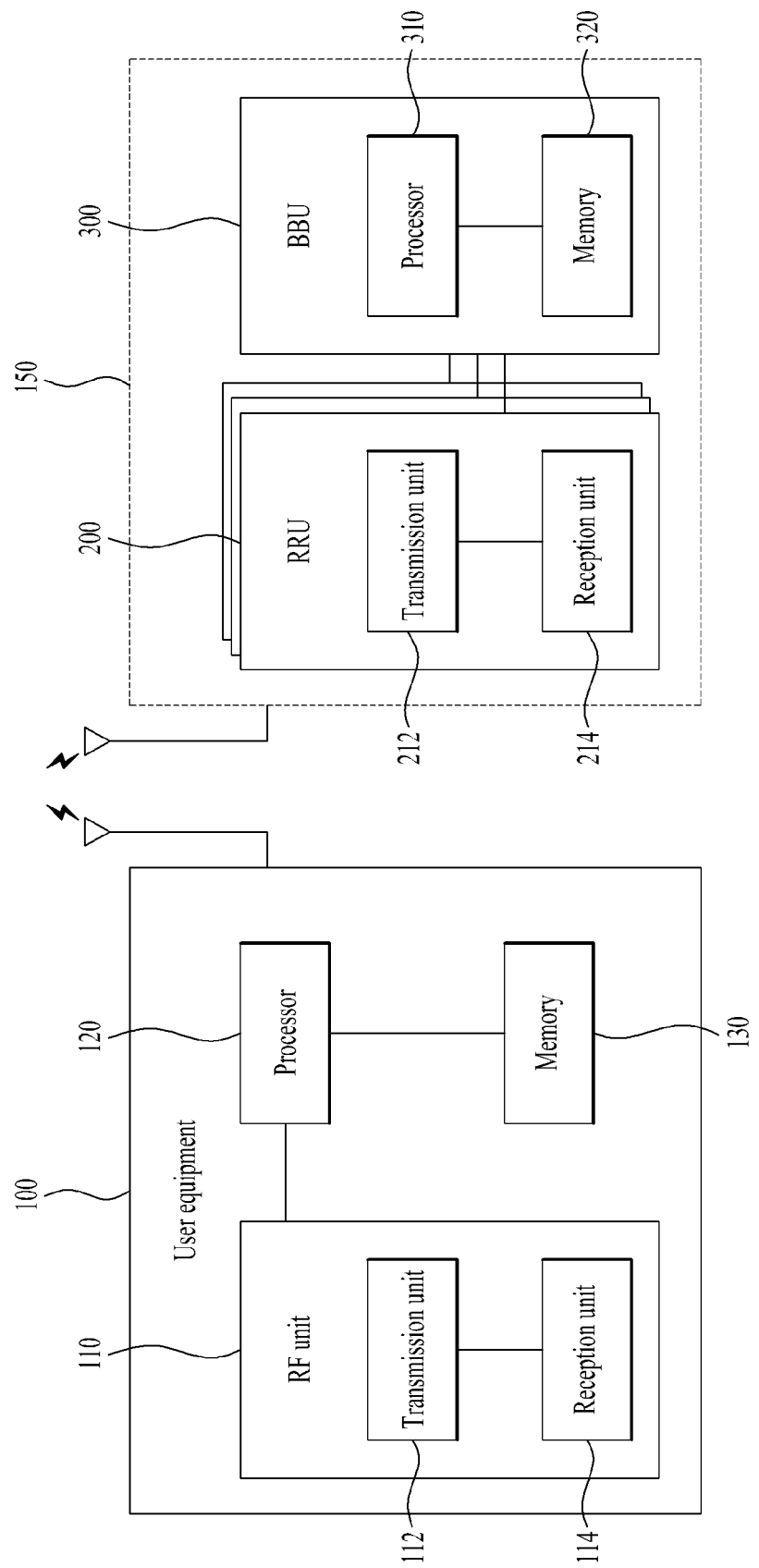
FIG. 10 is a block diagram of a UE configuring a UE-based communication area according to one embodiment of the present invention.

FIG. 10 is a block diagram of a UE configuring a UE-based communication area according to one embodiment of the present invention.

Although FIG. 10 shows one-to-one communication environment between a UE 100 and an RRU 200, communication environment can be constructed between a plurality of UEs and an RRU.

Referring to FIG. 10, a UE 100 can include a radio frequency (RF) unit 110, a processor 120 and a memory 130. A legacy base station is configured to have all of a transmission unit 212, a reception unit 214, a processor 310 and a memory 320. On the other hand, in a cloud radio access network environment, components included in the legacy base station 150 are implemented in a manner of being divided into an RRU 200 and a BBU 300.

Hence, the RRU 200, which simply plays a role of an antenna, includes the transmission unit 212 and the reception unit 214 only. And, overall processes of a communication including signal processing, layer processing and the like are controlled by the processor 310 and the memory 320 included in the BBU 300. And, such various connection relations as 1:1, 1:N, M:1, M:N and the like (where M an N is natural number) can be formed between the RRU 200 and the BBU 300.

The RF unit 110 included in the UE 100 can include a transmission unit 112 and a reception unit 114. The transmission unit 112 and the reception unit 114 are configured to transceive a signal with the RRU 200. The processor 120 is functionally connected with the transmission unit 112 and the reception unit 114 in the RF unit and can be configured to control the transmission unit 112 and the reception unit 114 to transceive a signal with a different device. And, the processor 120 performs various processing on a signal to be transmitted and can transmit the signal to the transmission unit 112. The reception unit 114 can perform processing on the received signal.

If necessary, the processor 120 can store information included in an exchanged message in the memory 130. The UE 100 can perform the above-mentioned various embodiments of the present invention using the aforementioned structure.

The transmission unit 212 and the reception unit 214 of the RRU 200 are configured to transceive a signal with the UE 100. The processor 310 of the BBU 300, which is connected with the RRU 200, is functionally connected with the transmission unit 212 and the reception unit 214 of the RRU 200 and can be configured to control the transmission unit 212 and the reception unit 214 to transceive a signal with a different device. And, the processor 310 performs various processing on a signal to be transmitted and can transmit the signal to the transmission unit 212. The reception unit 214 can perform processing on the received signal.

If necessary, the processor 310 can store information included in an exchanged message in the memory 320. The RRU 200 and the BBU 300 can perform the above-mentioned various embodiments of the present invention using the aforementioned structure.

The processor 120/310 of the UE 100 and the BBU 300 indicates (e.g., controls, adjusts, manages and the like) operations of the UE 100, the RRU 200 and the BBU 300. Each of the processors 120/310 can be connected with the memory 130/320 capable of storing program codes and data. The memory 130/320 can store an operating system, an application and general files in a manner of being connected with the processor 120/310.

The processor 120/310 of the present invention can be called a controller, a microcontroller, a microprocessor, a microcomputer or the like. Meanwhile, the processor 120/310 can be implemented by hardware, firmware, software or a combination thereof.

In case of the implementation by firmware or software, one embodiment of the present invention can be implemented by modules, procedures, and/or functions for performing the above-explained functions or operations. Software code is stored in a memory 130/320 and is then drivable by a processor 120/310. The memory is provided within or outside of the UE 100 and the BBU 300 to exchange data with the processor 120/310 through the various means known in public.

In the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like installed in the processor 120/310.

Meanwhile, the aforementioned method can be written by a program executable in a computer and can be implemented by a common digital computer capable of operating the program. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disc, a hard disc and the like) and an optical reading media (e.g., a CD-ROM, a DVD and the like).

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

INDUSTRIAL APPLICABILITY

A method of configuring a user equipment-based communication area of the present invention can be applied to various radio access network systems including a cloud radio access network system.

What is claimed is:

1. A method for a user equipment (UE) to perform a communication in a cloud radio access network environment, the method comprising:
    generating an RRU (Remote Resource Unit) list based on signal strength of downlink signals received from each of one or more RRUs;
    transmitting the generated RRU list to a first BBU (base band unit) via a first RRU among the one or more RRUs;
    receiving, from the first BBU via the first RRU, information on a second RRU decided by the first BBU based on the transmitted RRU list;
    establishing an RRC (Radio Resource Control) connection with the second RRU within the UE-based communication area; and
    setting a UE-based communication area with respect to the second RRU,
    wherein an RRU containing a greatest resource space status value and a greatest access space status value within the transmitted RRU list is determined as the second RRU by the first BBU by comparing system information of each of RRUs contained in the transmitted RRU list with each other, and
    wherein, when a first RRU connected with the first BBU and a second RRU not connected with the first BBU coexist in the transmitted RRU list, the comparison is performed after the first BBU obtains SI (System Information) of the second RRU by exchanging information with a second BBU connected with the second RRU.

2. The method of claim 1, further comprising:
    receiving, from the first BBU via the first RRU, information on a third RRU decided by the first BBU based on the transmitted RRU list;
    establishing an RRC connection with the third RRU; and
    setting the UE-based communication area with respect to the second RRU and the third RRU.

3. The method of claim 1,
    wherein the UE identifies one or more downlink signals containing signal strength greater than a predetermined specific value among the received downlink signals, and
    wherein the generated RRU list contains information on RRUs, which have transmitted the identified one or more downlink signals.

4. The method of claim 1, wherein each of the one or more RRUs is connected with one or more BBUs and wherein the connection is performed via a backhaul network.

5. The method of claim 1,
    wherein each of the received downlink signals comprises an RRU identification and a virtual cell identification,
    wherein the RRU identification corresponds to an identification of an RRU, which has transmitted each of the downlink signals, and
    wherein the virtual cell identification corresponds to an identification of a BBU pool (virtual BBU server) containing BBUs connected with the RRU, which has transmitted each of the downlink signals.

6. The method of claim 1, wherein the generated RRU list is further transmitted to each of RRUs contained in the RRU list via the first RRU.

7. The method of claim 1,
    wherein the UE camps on for each of RRUs contained in the generated RRU list,
    wherein system information (SI) containing information on a resource space status value and an access space status value of each of the RRUs is received from each of the RRUs on which the UE camps on, and
    wherein an RRU containing a greatest resource space status value and a greatest access space status value within the generated RRU list is determined as the first RRU by the UE by comparing each of the received system information with each other.

8. The method of claim 7, wherein each of the resource space status value and the access space status value is represented by one of a high, a medium or a low value.

9. The method of claim 7,
    wherein, when the first RRU is an RRU containing a greatest resource space status value and a greatest access space status value within the transmitted RRU list, the first RRU is decided as the second RRU by the first BBU, and
    wherein the establishing the RRC connection with the second RRU is performed with the first RRU.

10. A user equipment (UE) performing a communication in a cloud radio access network environment, comprising:
    a transmission unit;
    a reception unit; and
    a processor,
    wherein the processor is configured to:
        support a communication performance of the UE in a manner of being connected with the transmission unit and the reception unit,
        generate an RRU (remote resource unit) list based on signal strength of downlink signals received from each of one or more RRUs,
        transmit the generated RRU list to a first BBU (base band unit) via a first RRU among the one or more RRUs,
        receive, from the first BBU via the first RRU, information on a second RRU decided by the first BBU based on the transmitted RRU list,
        establish an RRC (Radio Resource Control) connection with the second RRU
        wherein an RRU containing a greatest resource space status value and a greatest access space status value is determined as the second RRU by the first BBU by comparing system information of each of RRUs contained in the transmitted RRU list with each other, and
        wherein, when a first RRU connected with the first BBU and a second RRU not connected with the first BBU coexist in the transmitted RRU list, the comparison is performed after the first BBU obtains SI(System Information) of the second RRU by exchanging information with a second BBU connected with the second RRU.

11. The user equipment of claim 10, wherein the processor is further configured to:
    receive, from the first BBU via the first RRU, information on a third RRU decided by the BBU based on the transmitted RRU list,
    establish an RRC connection with a third RRU, and
    set the UE-based communication area with respect to the second RRU and the third RRU.

12. The user equipment of claim 10,
wherein the processor is configured to identify one or more downlink signals containing signal strength greater than a predetermined specific value among the received downlink signals, and
wherein the generated RRU list contains information on RRUs, which have transmitted the identified one or more downlink signals.

13. The user equipment of claim 10, wherein each of the one or more RRUs is connected with one or more BBUs and wherein the connection is performed via a backhaul network.

14. The user equipment of claim 10,
wherein each of the received downlink signals comprises an RRU identification and a virtual cell identification,
wherein the RRU identification corresponds to an identification of an RRU, which has transmitted each of the downlink signals, and
wherein the virtual cell identification corresponds to an identification of a BBU pool (virtual BBU server) containing BBUs connected with the RRU, which has transmitted each of the downlink signals.

15. The user equipment of claim 10, wherein the generated RRU list is further transmitted to each of RRUs contained in the generated RRU list via the first RRU.

16. The user equipment of claim 10, wherein the processor is configured to:
perform a camp on for each of RRUs contained in the generated RRU list,
receive system information (SI) containing information on a resource space status value and an access space status value of each of the RRUs from each of the RRUs for which the camp on is performed, and
determine an RRU containing a greatest resource space status value and a greatest access space status value within the generated RRU list as the first RRU by the UE by comparing each of the received system information with each other.

17. The user equipment of claim 16, wherein each of the resource space status value and the access space status value is represented by one of a high, a medium or a low value.

18. The user equipment of claim 16,
wherein, when the first RRU is an RRU containing a greatest resource space status value and a greatest access space status value within the transmitted RRU list, the first RRU is decided as the second RRU by the first BBU, and
wherein the establishing the RRC connection with the second RRU is performed with the first RRU.

* * * * *